[104.]
Geo. W. Walker.
Imp't in Cooking Stoves.
No. 4,540. Reissued Aug. 29, 1871.
B.
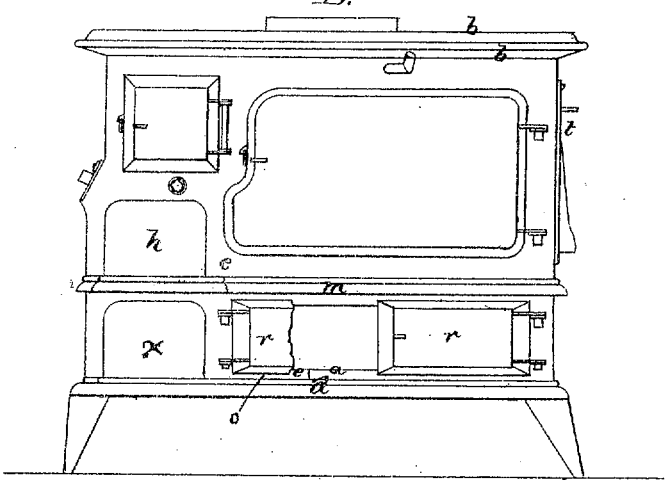
C.
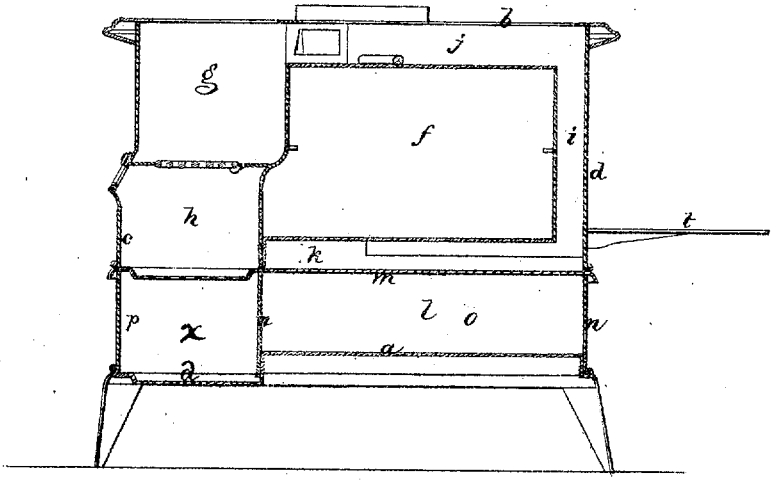
A.
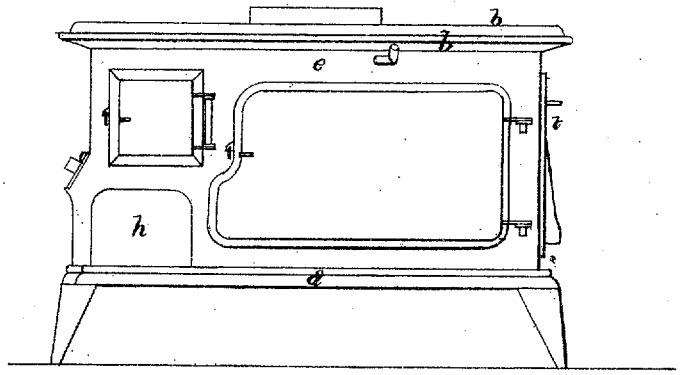
Witnesses.
S. B. Kidder.
M. W. Nottingham.
Geo. W. Walker
by his Attys.
Crosby & Gould
AM. PHOTO-LITHOGRAPHIC CO. N.Y. (OSBORNE'S PROCESS.)

UNITED STATES PATENT OFFICE.

GEORGE W. WALKER, OF MALDEN, MASSACHUSETTS.

IMPROVEMENT IN COOKING-STOVES.

Specification forming part of Letters Patent No. 108,852, dated November 1, 1870; reissue No. 4,540, dated August 29, 1871.

*To all whom it may concern:*

Be it known that I, GEORGE W. WALKER, of Malden, in the county of Middlesex and State of Massachusetts, have invented Improvements in Cooking-Stoves; and I do hereby declare that the following, taken in connection with the drawing which accompanies and forms part of this specification, is a description of my invention, sufficient to enable those skilled in the art to practice it.

My invention relates to the construction of cooking-stoves, with particular reference to the disposition of a hot closet directly beneath the oven or oven-flues, or between the oven or its flues and the bottom plate of the stove. The principal object of my improvement is the adaptation of the vertical plates of a common stove to the reception of a removably attached hot closet, so that the same stove or stove-plates may be made and set up either with or without the closet, it being converted from a plain stove to one with the closet by simply detaching the main stove-body from its bottom plate and raising it up and introducing under it the hot closet, the plates of which fit to the plates of the stove so that, to all appearance, the closet forms an integral part of the stove.

The drawing represents a stove embodying my improvements. A shows the common stove in front elevation; B, a similar elevation, the hot closet being added. C is a vertical longitudinal section.

*a* denotes the bottom plate; *b*, the top plate; *c d*, the end plates; and *e*, the front plate of the main stove or stove-body, the bottom plate *a* being extended in front to form a hearth-plate. *f* denotes the oven; *g*, the fire-pot; and *h*, the ash-pit. Over the oven is a flue-space, *j*, and at the back and under the oven are the oven-flues *i* and *k*, the bottom of the oven forming the top plate of the flues *k*, while, when the stove is set up without the closet, the bottom plate of the stove forms the bottom plate of the oven-flue. *l* denotes the hot closet or chamber, made with a top plate, *m*, end plates *n n*, and front and rear plates *o o*, connected together, the plates *o o* being extended to the end of the stove and having a vertical cross-plate, *p*, that forms, with the end plate *c*, the end of the stove, the two adjacent plates *u p* and plates *o o* forming an ash-chamber or sifting-chamber, *x*, beneath the main ash-pit *h*. At the front of the hot closet are suitable doors *r*, and the bottom plate of the stove constitutes the bottom plate of the closet, said plate *a* being raised, as seen at C, so as to form a frame, around which the vertical plates of the closet or those of the main stove-body fit, and also so that the bottom plate may be brought up flush with the top of the front plate *o*, below the opening controlled by the doors *r*, constituting a floor, over which dishes may be slid directly into and from the closet without employing a plate-rack while securing the full depth to the lower ash-pit.

It will be observed that there are no hot-air spaces around the closet, the oven-flue over it being its only source of heat, except from radiation of heat from the main stove-plate, it being desirable that the closet shall be heated only to a slight degree.

It will also be observed that the addition of the closet does not in the least detract from the general appearance of the stove, all its outer plates being flush with the main stove-plates except at the front end, and an auxiliary plate being there used, which gives a finish to the end of the stove and secures a sifting-chamber, into which the ashes may be screened from the coal in the ash-pit.

As before stated, I prefer to make this closet separable from the main stove, so that it may be placed under the main stove, as seen at B and C, or removed therefrom, or the stove be set up without the closet, as circumstances may render desirable.

Against the end plate *d* of the stove there is shown a swing or hinged shelf, *t*, jointed to the plate *d* so that it may be held up against it, as seen at C, or may be thrown down and supported in horizontal position, as seen at B, it serving as a shelf when down and to prevent radiation of heat from the plate *d* when fastened against it.

It will be observed that by my construction of a sectional or storied stove the manufacturer can use the same main stove-plates for making a low stove or for making a high stove, interposing for the high stove a sub-chambered base, the top of which fits under and to the plates of the main stove, which has no bottom or base (when the sub-chamber is placed under it) other than that furnished by the plates and bottom or base of the sub-chamber, differing in this respect from a stove which, with its bottom plate or base, is raised up and a sub-base slid under it.

I claim—

1. In combination with the main stove or stove-body, the removable hot closet, arranged as described, when at the end of such closet, and separated therefrom by a wall, *n*, is an ash-pit space, located under the main ash-pit *h*, substantially as shown and described.

2. A stove having a hot closet under the oven or oven-flues and an auxiliary ash-pit or sifting-chamber, *x*, in front of said closet and under the main ash-pit, when the bottom plate of the chamber *x* is below the plane of the bottom plate of the hot-air closet, substantially as shown and described.

3. A stove made in detachable horizontal sections, the upper one of which forms a complete stove by removing it from the lower one and placing under it a suitable bottom or base-plate.

GEO. W. WALKER.

Witnesses:
FRANCIS GOULD,
S. B. KIDDER.